April 16, 1968 D. E. WALDECKER ETAL 3,378,677

SERIAL DIVIDER

Filed Oct. 4, 1965 5 Sheets-Sheet 1

INVENTORS
LEONARD C. HIGBY, JR.
DONALD E. WALDECKER

BY *Thomas & Thomas*

ATTORNEYS

SERIAL DIVIDER

United States Patent Office 3,378,677
Patented Apr. 16, 1968

3,378,677
SERIAL DIVIDER
Donald E. Waldecker and Leonard C. Higby, Jr., Endicott, N.Y., assignors to International Business Machines Corporation, Armonk, N.Y., a corporation of New York
Filed Oct. 4, 1965, Ser. No. 492,551
12 Claims. (Cl. 235—164)

ABSTRACT OF THE DISCLOSURE

A serial divider is provided with an arithmetic device having a plurality of adder-subtracter units in tandem each of which yields a quotient but during each iteration, and control means is provided with logic circuits which sample the results during one iteration to provide appropriate control signals for the adder-subtracter units during the next iteration.

This invention relates to arithmetic devices and more particularly to such devices for performing divide operations.

The invention described herein was made in the performance of work under a NASA contract, and it is subject to the provisions of the National Aeronautics and Space Act of 1958, Public Law 85-568 (72 Stat. 462; 42 U.S.C. 2451), as amended.

This invention utilizes the recursion technique to perform serial division. The recursion formula may be expressed as:

(1) $$R_{i+1}=2R_i+(1-2Q_i)DV$$

(2) $$\overline{Q_i=R_i \text{ sign} \oplus DV \text{ sign}}$$

where:

$i=0, 1, 2, 3, \ldots (n-l)$.
$n$=the number of quotient bits to be generated
$Q_i$=the $i$th quotient bit
$DV$=the divisor
$R_i$=the $i$th remainder Since sums and differences of numbers are generated low order first in serial machine, the sign of the sum or difference is not known until the addition or subtraction is complete since the sign is located one higher order beyond the high order bit in the numbers involved. It is readily apparent from Equation 2 that the quotient bit $Q_{i+1}$ cannot be determined until the sign of the remainder $R_{i+1}$ has been determined. Thus, only one quotient bit can be developed by a conventional serial divider in one iteration because the sign of the remainder is the last thing determined in each iteration. The limit of one quotient bit per iteration in a serial divider make the process slow, and a considerable period of time is required to develop a quotient, particularly where the quotient has a large number of bits.

Accordingly, it is a feature of this invention to provide an improved divider which develops a quotient in a serial divider arrangement by determining in advance what the sign of the remainders will be for two or more successive remainders and utilizing the signs thus determined to manipulate a plurality of adder-subtracter devices to generate successive remainders during the same time period or cycle of operation. Once the signs of several remainders are known, it is readily apparent from Equation 2 that the proper quotient bits can be determined.

It is a feature of this invention to provide an improved serial divider which substantially reduces the time customarily required to perform division in a serial divider.

It is another feature of this invention to provide an improved divider which reduces considerably the time customarily required to perform serial division with a nominal increase in equipment.

It is a further feature of this invention to provide an improved serial divider which is efficient in operation, simple in construction and economical to manufacture and maintain.

In one arrangement according to this invention the time required to develop a quotient in a serial divider arrangement is reduced by utilizing a plurality of adder-subtracter devices in tandem. Each adder-subtracter is manipulated to perform either an add operation or a subtract operation, and to so manipulate them requires advance knowledge of the sign of the remainder to be developed in each adder-subtracter before the remainder is developed therein. Lookahead logic is provided for this purpose, and it determines in one iteration the overflow conditions, either borrow or carry, which will result in the next iteration from each adder-subtracter except the last one. The add or subtract control for the first adder-subracter in the tandem arrangement is determined simply by comparing the sign of the divisor with the sign of the remainder as it emanates from the last adder-subtracter in the tandem arrangement. After the proper determination for controlling the first adder-subtracter is made, this information along with the overflow condition from the first adder subtractor and the high order sum bit from the third adder-subtracter in the preceding iteration is used to determine whether the second adder-subtracter should perform an add operation or a subtract operation. Once the determination is properly made from the first and second adder-subtracters, this information along with the overflow condition from the second adder-subtracter is used to determine whether the third adder-subtracter in the tandem arrangement should perform an add or subtract operation provided that the high order sum bit predicted for the first adder-subtracter is made available. The high order sum bit for the first adder-subtracter is determined by a partial adder in the preceding iteration and the results stored for use in the present iteration. In this fashion stored for use in the present iteration. In this fashion the proper determination to add or subtract is made for the fourth and subsequent adder-subtracters by equipment in the look-ahead logic in response to the decisions made for each of the preceding adder-subtracters, the ovreflow condition and the high order sum bit which is to be developed in each adder-subtracter in the next iteration. The degree to which this technique may be expanded is dictated by cost considerations because the equipment in the look-ahead logic increases for each successive adder-subtracter stage.

The foregoing and other objects, features and advantages of the invention will be apparent from the following more particular description of preferred embodiments of the invention, as illustrated in the accompanying drawings.

Figure 2:
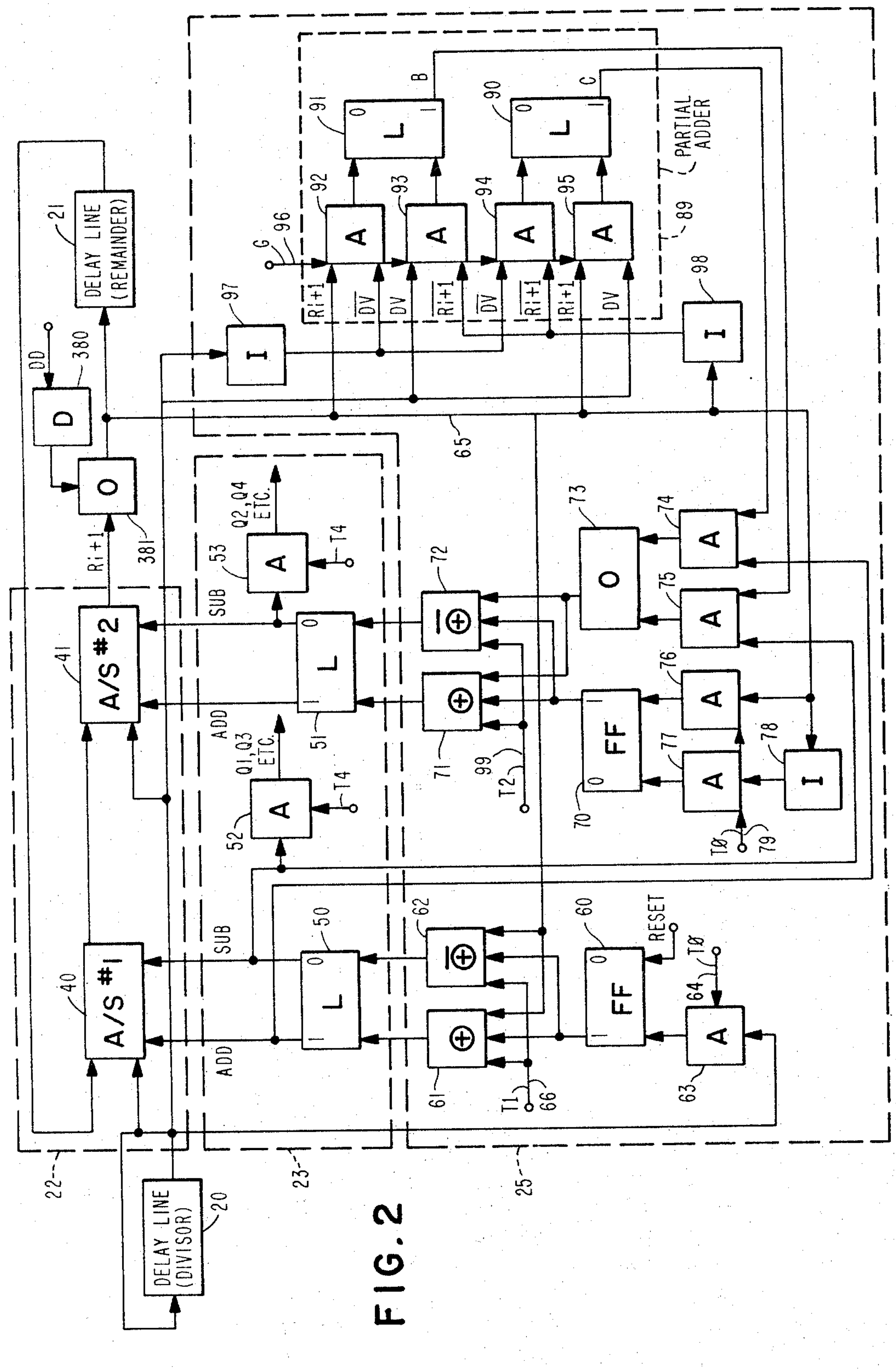
FIGURE 2 illustrates one embodiment according to this invention which employs two adder-subtracter devices in tandem.
Figure 5:
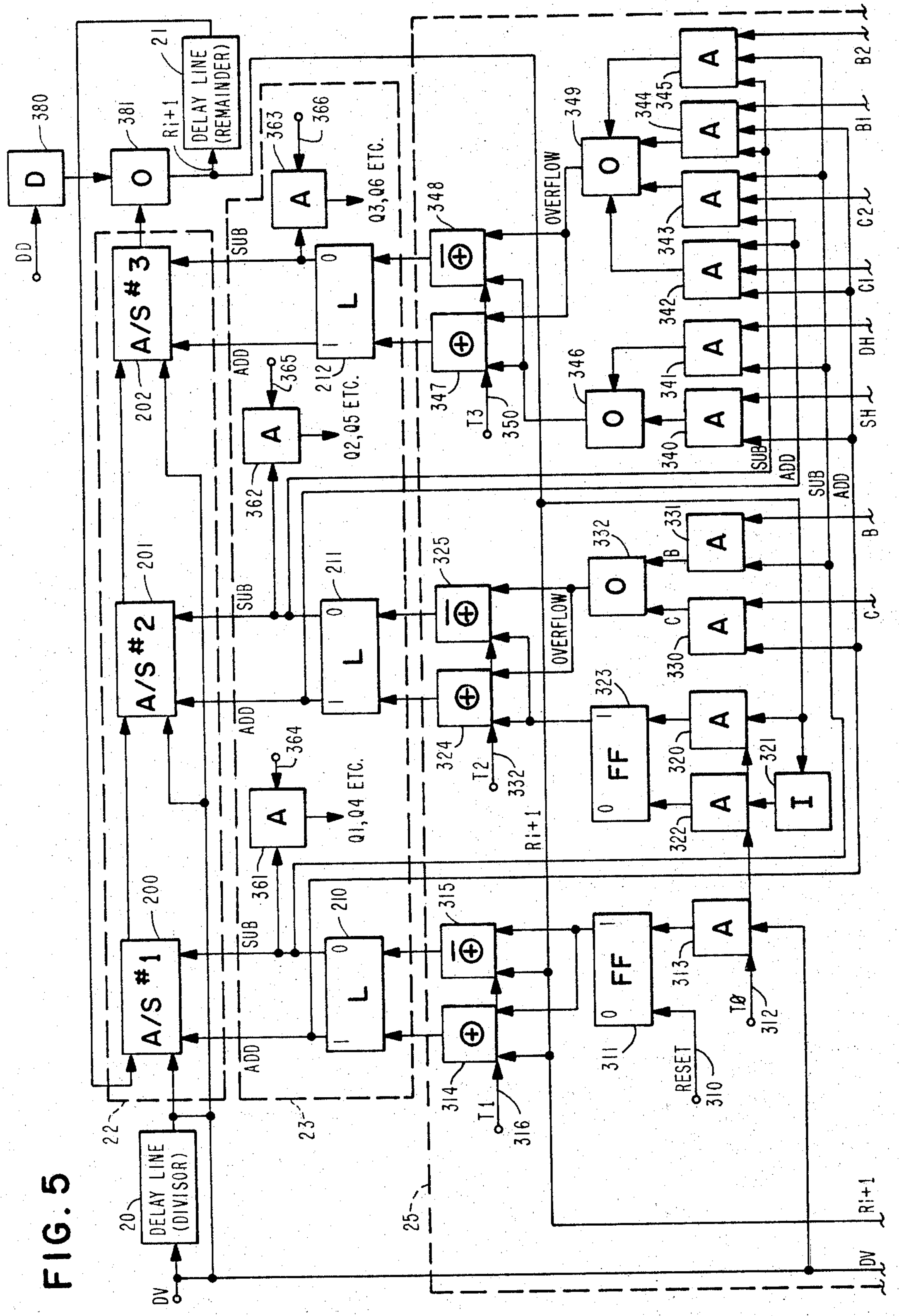
FIGURES 5 and 6 illustrate another embodiment according to this invention which employs three adder-subtracter devices in tandem.
Figure 6:
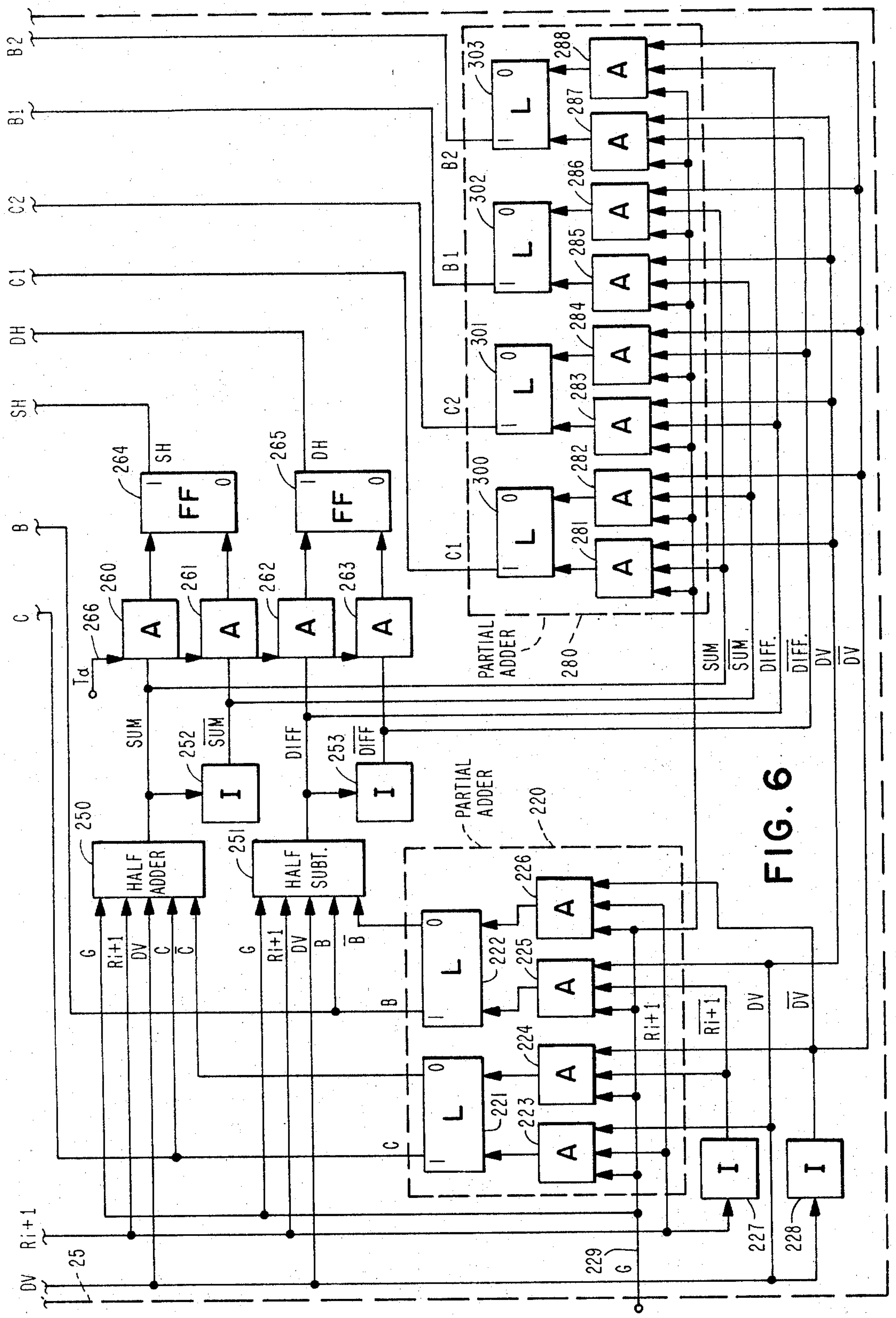

A logic block diagram of one embodiment of this invention is illustrated in FIGURE 2, and another embodiment is illustrated in FIGURES 5 and 6. The block diagrams in these figures are described with respect to the manner in which the various circuit components or blocks are interconnected and the overall operation performed by each of these components or blocks. The description of the block diagrams is followed by separate and detailed descriptions of the various components or blocks where it is so required. Bold face character symbols appearing within a block identify the common name for the circuit represented e.g. A for And circuit and ⊕ for exclusive Or circuit. It is arbitrarily assumed throughout the description that positive logic is employed unless indicated otherwise. That is, the logic circuits such as And and Or circuits, are operated by positive signal levels at the input to provide a positive signal level at the output. A binary 0 is represented by a negative signal or no signal level, and a binary 1 is represented by a positive signal level. Binary numbers are expressed as fractions with a plus or minus sign. A plus sign is represented by a binary 0, and a minus sign is represented by a binary 1. Binary numbers have the format 0.10100 where the zero on the left indicates a plus sign, and the numbers to the right of the binary point express a fraction which is the decimal equivalent of ⅝. The rightmost position of the binary number represents the lowest order.

Figure 1:
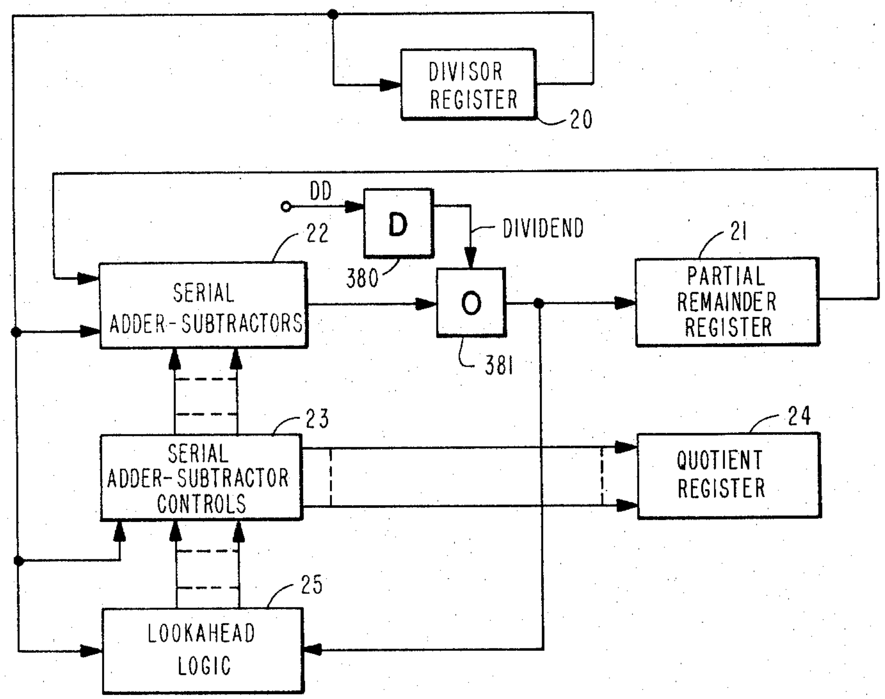
FIGURE 1 illustrates in block form a serial divider arrangement according to this invention.

Reference is made first to FIGURE 1 for an illustration of the system aspects of a divider arrangement according to this invention. The divider arrangement employs a divisor and a dividend represented by signals supplied in serial form. For this purpose delay lines are suitably employed to store the divisor and the divided or partial remainders. Registers 20 and 21 are utilized to store signals representing the divisor and the partial remainders. The iterative technique of a serial divider involves successive add or subtract operations of the divisor and partial dividend or remainder. The divisor and the remainder are supplied from their respective registers 20 and 21 to serial adder-subtracters 22 which has a plurality of single-stage adder-subtracter devices connected serially as explained more fully hereinafter. The use of a plurality of such adder-subtracter devices permits one remainder to be determined by each such adder-subtracter device during each iteration, and the time for performing a division problem by a serial adder is substantially reduced. The serial adder-subtracters 22 in FIGURE 1 are manipulated by signals from a control device labeled serial adder-subtracter controls 23, and its signals to the serial adder-subtracters 22 manipulate the individual adder-subtracters therein to perform either an add operation or a subtract operation, depending in each individual case upon the signs of the divisor and the remainder to be developed in each adder-subtracter. The condition of the control circuits in the serial adder-subtracter controls 23 may be sampled to provide the proper quotient bits, and such quotient bits are supplied to a quotient register 24 during each iteration. The serial adder-subtracter controls 23 provide control signals to the serial adder-subtracters 22, and such control signals represent the proper add or subtract operations which are to be performed during the ensuing iteration. It is necessary to make appropriate changes in the control signals at or before the commencement of the next iteration, and for this purpose a device labeled lookahead logic 25 is employed. It examines the signals representing the divisor and the partial remainders as the latter are supplied to the remainder register 21 during each iteration. The lookahead logic determines how the serial adder-subtracter controls 23 should be set in order to manipulate properly the serial adder-subtracters 22 at or before the commencement of the next iteration.

Reference is made next to FIGURE 2 which illustrates in greater detail a circuit arrangement which may be employed for the divider arrangement shown in block form in FIGURE 1. The reference numerals employed in FIGURE 1 to designate the various blocks are likewise used in FIGURE 2 to designate corresponding parts. The serial adder-subtracters 22 in FIGURE 2 illustrates the use of two individual adder-subtracter devices 40 and 41. The storage registers 20 and 21 are illustrated as delay lines for storing the divisor and the partial remainders. The serial adder-subtracter controls 23 includes latches 50 and 51. When the latch 50 is set to the one state, it supplies a positive signal which causes the adder-subtracter device 40 to perform an add operation on the divisor and the remainder supplied thereto in serial form. When the latch 50 is in the zero state, it supplies a positive signal on the zero output line to the adder-subtracter device 40 which causes it to perform a subtract operation on the divisor and the remainder supplied in serial form thereto. The latch 51 performs in like fashion to control whether the adder-subtracter device 41 performs a subtract or an add operation on the divisor and the remainder supplied thereto in serial form. And circuits 52 and 53 are disposed on the respective zero output sides of the latches 50 and 51. These And circuits are sampled by a pulse at time T4 of each iteration, and the appropriate quotient bits are supplied to the quotient register 24 in FIGURE 1 for storage. Note that the And circuit 52 supplies quotient bit Q1 during the first iteration, and the And circuit 53 supplies the quotient bit Q2 during the first iteration. During the second iteration the And circuit 52 supplies quotient bit Q3, and the And circuit 53 supplies the quotient bit Q4. Thus it is seen that these And circuits provide two quotient bits for each iteration.

Figure 3:
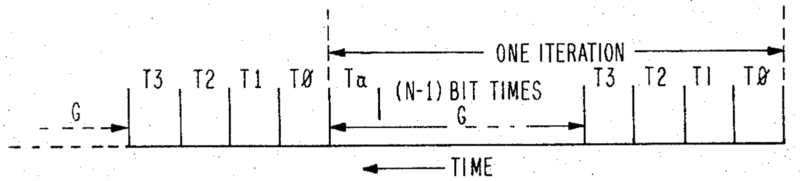
FIGURE 3 is a timing diagram which is helpful in explaining the operation of this invention.

The lookahead logic 25 in FIGURE 2 includes a flip-flop 60, an exclusive Or circuit 61, and an $\overline{\text{exclusive Or}}$ circuit 62 which are connected as shown. These circuits establish the appropriate control signals for the latch 50 which in turn controls the adder-subtracter device 40. At time T0 a signal representing the sign of the divisor is applied to an And circuit 63, and this And circuit is sampled by a pulse at time T0 on a line 64. Thus the state of the flip-flop 60 thereafter represents the sign of the divisor. The output from the one side of the flip-flop 60 is a positive level when the sign of the divisor is plus, and this signal level is negative when the sign of the divisor is minus. The sign of the dividend or remainder is supplied at time T1 on a line 65 to the exclusive Or circuits 61 and 62, and these exclusive Or circuits are sampled at time T1 by a positive signal on a line 66. One of the exclusive Or circuits 61 or 62 supplies a positive pulse to the one or zero input side of the latch 50, thereby setting this latch to the appropriate state for controlling the adder-subtracter device 40 during the ensuing iteration. When these signals are unlike, the exclusive Or circuit 61 supplies a positive output signal, and when these signs are alike, the $\overline{\text{exclusive Or}}$ circuit 62 supplies a positive output signal at time T1. FIGURE 3 shows a timing diagram. The pulses T0 and T1 occur during the time periods in FIGURE 3 designated as T0 and T1.

The lookahead logic 25 in FIGURE 2 includes a flip-flop 70 which has its one output side connected to exclusive Or circuits 71 and 72. An Or circuit 73 has its output coupled also to the exclusive Or circuits 71 and 72. The circuit 72 is a $\overline{\text{exclusive Or}}$. An Or circuit 73 supplies an output signal to the exclusive Or circuits 71 and 72. And circuits 74 through 77 and an inverter 78 are connected as shown. Signals representing the high order bit of the remainder are supplied on the line 65 to the And circuit 76, and signals representing the high order bit of the remainder are inverted by the inverter 78 and applied to the And circuit 77. A signal representing the high order bit of a remainder is supplied on the line 65 to the And circuits 76 and 77 at time T0, and these And circuits are sampled by a signal on a line 79 at time T0. Thus the flip-flop 70 is set or not set to represent the high order bit of the given remainder, and the output signal supplied to the exclusive Or circuits 71 and 72 properly represents this high order bit. The And circuits 74 and 75 receive the respective one and zero outputs of the latch 50. The And circuit 74 receives a positive signal level from the one output side of the latch 50 when the adder-subtracter device 40 is to perform an add operation, and the And circuit 75 receives a positive signal level from the zero output side of the latch 50 when the adder-subtracter device 40 is to perform a subtract operation. The And circuits 74 and 75 receive signals from the one output side of respective latches 90 and 91 which constitute a portion of a partial adder 89. These latches are controlled in turn by And circuits 92 through 95 which are sampled during G time by a positive signal on a line 96. These And circuits receive as inputs divisor or $\overline{\text{divisor}}$ and the remainder or $\overline{\text{remainder}}$. The inverter 97 receives the divisor as an input and supplies $\overline{\text{divisor}}$ as an output, and the inverter 98 receives the remainder as an input and supplies $\overline{\text{remainder}}$ as an output. The outputs from the latches 91 and 90 are labeled B (for borrow) and C (for carry) as a convenience in treating the states of these latches logically in subsequent discussions. For example, when the one output of the latch 91 is a positive level, it represents B, and when the one output of this latch is a negative level, it represents $\overline{B}$. B represents $DV\cdot\overline{R}_{i+1}$, and $\overline{B}$ represents $\overline{DV}\cdot R_{i+1}$. C represents $DV\cdot R_{i+1}$, and $\overline{C}$ represents $\overline{DV}\cdot\overline{R}_{i+1}$. The partial adder 89 includes the And circuits 92 through 95 and the latches 90 and 91. The partial adder 89 determines whether a carry or borrow emanates from the second highest order position of the remainder from the adder-subtracter 41 when an add or a subtract operation is performed, as the case may be. The orders of the divisor and the remainder $R_{i+1}$ are supplied to the And circuits 92 through 95 in FIGURE 2 during the period G shown in FIGURE 3. Thus the line 96 in FIGURE 2 is energized with a positive signal during the G period thereby to condition the And circuits 92 through 95 when the bits of the divisor and the bits of the dividend are available as inputs thereto. The latches 90 and 91 are manipulated during G time to the zero or one states in each bit period, depending on bit combinations of the divisor and the remainder. The state of the latch 90 at the end of G time signifies the presence or absence of a carry if the divisor and the remainder $R_{i+1}$ are added, and the state of the latch 91 indicates the presence or absence of a borrow if the divisor and the remainder $R_{i+1}$ are subtracted. The carry or borrow condition is determined in one iteration and stored in the latches 90 and 91 for use during the subsequent iteration. The contents of the latches 90 and 91 in conjunction with the content of the latch 50 after it is set or not set in the next iteration are used to operate the And circuits 74 and 75 the outputs of which are conveyed through the Or circuit 73 to the exclusive Or circuits 71 and 72. These exclusive Or circuits receive a signal from the flip-flop 70 which represents the sign of the remainder $R_{i+1}$. The exclusive Or circuits 71 and 72 are sampled at time T2 by a positive signal on a line 99. The outputs of the exclusive Or circuits 71 and 72 are applied to the latch 51. The latch 51 is set to the one state when an add operation is to be performed by the adder-subtracter circuit 41, and the latch 51 is set to the zero state if the adder-subtracter circuit 41 is to perform a subtract operation.

Chart I below illustrates the relationship between the signs of the divisor and the dividend, the generation of the carry or borrow involved and the control exercised at the adder-subtracters 40 and 41 for the case where two adder-subtracter devices are employed in serial fashion.

CHART I

| DV (sign) | R (high order bit) | C generated or propagated by the next to high order positions of DV & $R_{i+1}$ at A/S #1 | B generated or propagated by the next to high order positions of DV & $R_{i+1}$ at A/S #1 | Operation at A/S #1 | Operation at A/S #2 |
|---|---|---|---|---|---|
| 0 | 0 | 0 | Ø | Add | Sub. |
| 0 | 0 | 1 | Ø | Add | Add. |
| 0 | 1 | 0 | Ø | Add | Add. |
| 0 | 1 | 1 | Ø | Add | Sub. |
| 1 | 0 | 0 | Ø | Add | Sub. |
| 1 | 0 | 1 | Ø | Add | Add. |
| 1 | 1 | 0 | Ø | Add | Add. |
| 1 | 1 | 1 | Ø | Add | Sub. |
| 0 | 0 | Ø | 0 | Sub | Sub. |
| 0 | 0 | Ø | 1 | Sub | Add. |
| 0 | 1 | Ø | 0 | Sub | Add. |
| 0 | 1 | Ø | 1 | Sub | Sub. |
| 1 | 0 | Ø | 0 | Sub | Sub. |
| 1 | 0 | Ø | 1 | Sub | Add. |
| 1 | 1 | Ø | 0 | Sub | Add. |
| 1 | 1 | Ø | 1 | Sub | Sub. |

The latches employed in FIGURE 2 may be any one of various types of such circuits, and one suitable type is illustrated and described in Patent 3,192,364. Latch control signals have been omitted in FIGURE 2 and in other figures described subsequently in the interest of simplicity.

Figure 4:
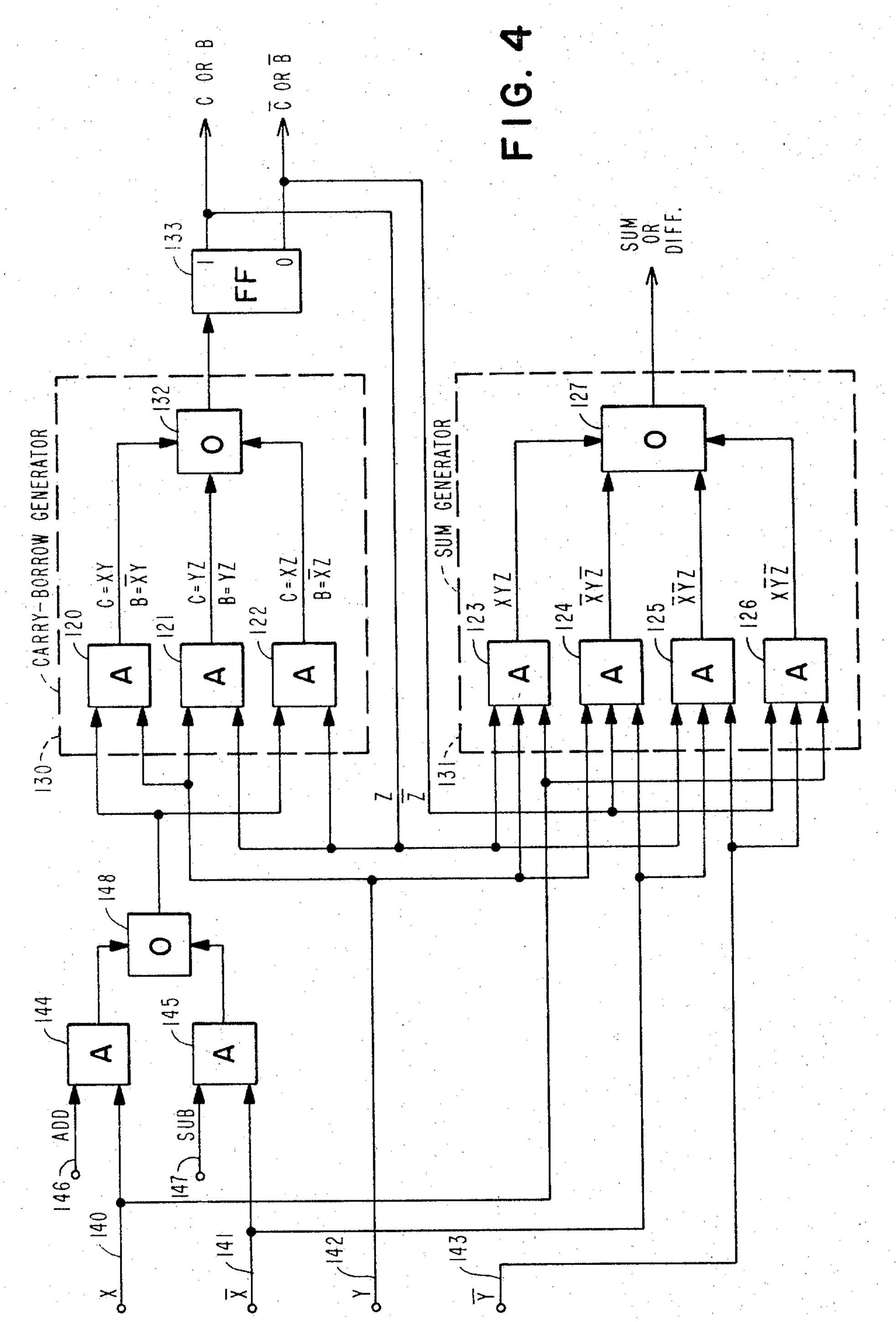
FIGURE 4 illustrates a suitable adder-subtracter device for use in this invention.

The adder-subtracter devices 40 and 41 in FIGURE 2 may be any one of various suitable types. However, one suitable adder-subtracter arrangement is illustrated in FIGURE 4. The carry, borrow and sum relationship of three numbers arbitrarily designated X, Y, and Z may be expressed as follows:

$$\text{Carry } C=XYZ+\overline{X}YZ+X\overline{Y}Z+XY\overline{Z} \quad (3)$$

$$\text{Borrow } B=\overline{X}YZ+XYZ+\overline{X}\overline{Y}Z+\overline{X}Y\overline{Z} \quad (4)$$

$$\text{Sum (or diff.)}=XYZ+\overline{X}Y\overline{Z}+\overline{X}\overline{Y}Z+X\overline{Y}\overline{Z} \quad (5)$$

If Equations 3 and 4 are simplified, the following simple equations result:

$$\text{Carry } C=XY+YZ+XZ \quad (6)$$

$$\text{Borrow } B=YZ+\overline{X}Z+\overline{X}Y \quad (7)$$

Reference is made to FIGURE 4 which illustrates the implementation of the logic expressed in Equations 5, 6 and 7. The function performed by each of the And circuits 120 through 126 is signified by the logical equations printed above and below the output lines. The And circuits 120 through 122 constitute a carry-borrow generator 130, and the And circuits 123 through 126 constitute a sum generator 131. The And circuits 120 through 122 have their outputs coupled through an Or circuit 132 to a flip-flop 133. The flip-flop stores the carry or borrow signals for one bit period as required by serial adders. The resolution time on the flip-flop may be adjusted to provide the necessary delay for one bit period. That is, when the input signal to the flip-flop 133 changes, the time required to change the flip-flop to the new state is equal to the one bit period of necessary delay.

Signals representing the quantities X, $\overline{X}$, Y, $\overline{Y}$ are supplied to respective lines 140 through 143. And circuits 144 and 145 receive the X and $\overline{X}$. The And circuit 144 receives a control signal on an input line 146 when X and Y are to be added, and the And circuit 145 receives a positive control signal on a line 147 when X and Y are to be subtracted. The outputs of the And circuits 144 and 145 are supplied through an Or circuit 148 to the carry-borrow generator 130. If the And circuit 144 receives a positive signal level on the control line 146, binary signals represented by X are supplied in true form to the carry-borrow generator 130, and an add operation is performed. When the control line 146 is energized with a positive signal, the control line 147 to the And circuit 145 is energized with a negative signal level, and when the control line 147 is energized with a positive signal level, the control line 146 is energized with a negative signal level. When the control line 147 is energized with a positive signal, the And circuit 145 passes signals which are the complement of X to the carry-borrow generator 130, and a subtract operation is performed.

Figure 7:
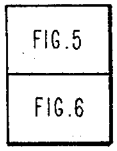
FIGURE 7 illustrates the manner in which FIGURES 5 and 6 physically should be arranged with respect to each other.

Reference is made to FIGURES 5 and 6 for an illustration of a divider arrangement which utilizes three adder-subtracter devices in series for generating three quotient bits per iteration. FIGURES 5 and 6 should be arranged with respect to each other in the manner indicated in FIGURE 7. The reference numerals employed in FIGURE 1 to designate the various blocks are likewise used in FIGURES 5 and 6 to designate corresponding parts. Referring to FIGURE 5, the block labelled serial adder-subtracters 22 is an arithmetic unit that has individual adder-subtracter devices 200 through 202 which are manipulated to perform add or subtract operations by respective latches 210 through 212 of the serial adder-subtracter control 23. The lookahead logic 25 in FIGURES 5 and 6 is described next.

The lookahead logic 25 in FIGURE 6 includes a partial adder 220 which is composed of a latch 221, a latch 222 and And circuits 223 through 226. Inverters 227 and 228 are employed to invert the respective remainder and divisor signals. The partial adder 220 has the same inputs as the partial adder 89 in FIGURE 2, and these two partial adders are identical in construction and operation.

The lookahead logic 25 in FIGURE 6 includes a half adder 250 and a half subtracter 251 which are operated during one iteration to determine the sum and the difference which will be generated at the output of the adder-subtracter 200 during the next iteration. More specifically, the output of the half-adder 250 in one iteration represents the high order sum bit which will be generated at the output of the adder-subtracter 200 in FIGURE 5 in the next iteration if the adder-subtracter 200 performs an add operation in the next iteration. Similarly, the output of the half subtracter 251 in one iteration represents the difference which will be developed at the output of the adder-subtracter 200 in FIGURE 5 in the next iteration if the adder-subtracter 200 performs a subtract operation in the next iteration. The sum output of the half adder 250 is supplied to an And circuit 260, and the sum output of half adder 250 is inverted by an inverter 252 and supplied as $\overline{\text{sum}}$ to an And circuit 261. The difference output of the half subtracter 251 is supplied to an And circuit 262, and the difference signal is inverted by an inverter 253 and supplied as $\overline{\text{difference}}$ to an And circuit 263. The outputs of the And circuits 260 through 263 are supplied to flip-flops 264 and 265 as shown. The output of flip-flop 264 is labeled SH, and it is supplied to controls in FIGURE 5. The output of the flip-flop 265 is labeled DH and it is supplied to controls circuit in FIGURE 6. The And circuits 260 through 263 are sampled by a pulse on a line 266 at pulse time T*a* at which time the sum and difference signals are stored in the flip-flops 264 and 265 for use in the next iteration.

The sum and difference signals from the half adder 250 and the half subtracter 251 are supplied to a partial adder 280 which determines the possible carry and borrow signals which may be generated at the output of the adder-subtracter 201 in the next iteration. The partial adder 280 includes And circuits 281 through 288 which receive the sum, difference, and divisor signals and their complement or inverse, as shown. The output of these And circuits are connected to latches 300 through 303 in the manner illustrated. The outputs of these latches, designated C1, C2, B1, and B2, in FIGURE 6 are connected to controls in FIGURE 5. The And circuits 281 through 288 of the partial adder 280 in FIGURE 6 are conditioned by a positive signal on the line 229 at G time which, as shown in FIGURE 3, is present during a portion of an iteration when arithmetic operations are taking place in the adder-subtracters 22 in FIGURE 5. Thus the signal combinations of the divisor and the remainder $R_{i+1}$ operate the And circuits 281 through 288 each bit period, and the result is stored in the latches 300 through 303 during each bit period. Any one or a combination of the latches 300 through 303 may change states one or more times during successive bit periods. The contents of the latches 300 through 303 at the end of the last bit period, which occurs upon the termination of the signal at G time, represent the possible carry signals C1 and C2 and the possible borrow B1 and B2 which may be generated at adder-subtracter 201 in the next iteration.

At a time prior to T0 a positive signal is supplied on a line 310 to reset a flip-flop 311. At time T0 a positive signal is supplied on a line 312 to sample an And circuit 313, and the flip-flop 311 is set or not set to represent the sign of the divisor. The flip-flop 311 supplies an output signal representing the sign of the divisor to an exclusive Or circuit 314 and a $\overline{\text{exclusive Or}}$ circuit 315. The sign of the remainder $R_{i+1}$ is supplied to these exclusive Or circuits at time T1 at which time a positive signal is supplied on a line 316 to sample these exclusive Or circuits. The outputs of the exclusive Or circuits 314 and 315 are supplied to the latch 210 during time T1, and the result is stored in the latch 210 during T1 time. The content of the latch 210 represents the result of comparing the sign of the divisor with the sign of the dividend which result determines whether an add or a subtract operation is to be performed by adder-subtracter 200 during the enusing iteration.

The sign of the remainder is supplied to an And circuit 320. Signals representing the sign of the remainder are inverted by an inverter 321 and applied to an And circuit 322. The And circuits 320 and 322 are sampled at T0 time, and the result is stored in a flip-flop 323. Signals representing the high order bit of the remainder are supplied from the one output side of the flip-flop 323 to exclusive Or circuits 324 and 325. The circuit 324 is an exclusive Or circuit, and the circuit 325 is an $\overline{\text{exclusive Or}}$ circuit. The outputs of the latch 210 are connected to the And circuits 330 and 331. The carry and borrow signals C and B from the partial adder 220 in FIGURE 6 are connected to the And circuits 330 and 331 in FIGURE 5. The And circuit 330 supplies a positive signal to an Or circuit 332 if an add operation is to be performed in the adder-subtracter 200 in the ensuing iteration and a carry signal C will be generated as a result of this addition. It is recalled that the carry signal C from the partial adder 220 in FIGURE 6 is determined during the preceding iteration. The And circuit 331 provides a positive signal to the Or circuit 332 whenever the adder-subtracter 200 is to perform a subtract operation during the ensuing iteration, and a borrow B will result from this subtraction. It is recalled that the borrow signal is developed in the partial adder 220 during the preceding iteration. The output of the Or circuit 332, representing either an add with a carry or a subtract with a borrow when it is a positive signal, is supplied to the exclusive Or circuits 324 and 325 by a positive sampling signal on a line 332 at time T2. With the high order bit of the remainder $R_{i+1}$ supplied by the flip-flop 323 and the overflow condition supplied by the Or circuit 332, representing an add operation with a resultant carry to take place in the adder-subtracter 200 or a subtract operation with a borrow to take place in the adder-subtracter 200 in the ensuing iteration, the exclusive Or circuits 324 and 325 are able to determine at time T2 whether the adder-subtracter 201 should add or subtract in the ensuing iteration. The result of the determination from the exclusive Or circuits 324 and 325 is stored in the latch 211 for the purpose of manipulating the adder-subtracter 201 to add or subtract, as the case may be, during the ensuing iteration.

The output of the latch 210, controlling whether an add or subtract operation is to take place in the adder-subtracter 200, and the output of the latch 211, controlling whether an add or subtract operation is to take place in the adder-subtracter 201, are supplied to And circuits 342 through 345. The signals SH, DH, C1, C2, B1 and B2 from FIGURE 6 are supplied to the respective And circuits 340 through 345. The outputs of the And circuits 340 and 341 are supplied through an Or circuit 346 to exclusive Or circuits 347 and 348. The outputs of the And circuits 342 through 345 are supplied through an Or circuit 349 to the exclusive Or circuits 347 and 348. The exclusive Or circuits 347 and 348 are sampled at T3 time by a positive signal on a line 350. The outputs of the exclusive Or circuits 347 and 348 are stored in the latch 212 during T3 time, and the outputs of this latch manipulate the adder-subtracter 202 to perform an add or subtract operation during the ensuing iteration.

The And circuit 340 in FIGURE 5 supplies a positive output signal to the Or circuit 346 whenever the adder-subtracter 200 is to perform an add operation during one iteration, and the result of that addition will produce a sum of 1 in the high order place. The And circuit 341 supplies a positive output signal whenever the adder-subtracter 200 is to perform a subtract operation, and the difference will produce a 1 in the high order place as a result of that subtraction. The And circuit 342 provides a positive output signal to the Or circuit 349 whenever the adder-subtracter 200 is to perform an add operation, the adder-subtracter 201 is to perform an add operation, and a carry of 1 will emanate from the high order place as a result of that addition. The And circuit 343 produces an output signal whenever the adder-subtracter 200 is to perform a subtract operation, the adder-subtracter 201 is to perform an add operation, and a carry C2 will result from the high order place from the adder-subtracter 201 as a result of that add operation. The And circuit 344 produces a positive output signal whenever the adder-subtracter 200 is to perform an add operation, the adder-subtracter 201 is to perform a subtract operation, and a borrow B1 will occur at the high order position as a result of the subtract operation in the adder-subtracter 201. The And circuit 345 produces a positive output signal whenever the adder-subtracter 200 is to perform a subtract operation, the adder-subtracter 201 is to perform a subtract operation, and a borrow will result at the high order position as a result of the subtraction in the adder-subtracter 201. Thus the outputs of the And circuits 343 through 345 convey a positive signal through the Or circuit 349 to the exclusive Or circuits 347 and 348 whenever an overflow condition will result from an add or a subtract operation in adder circuit 201. This information is compared with the signals SH or DH in the exclusive Or circuits 347 and 348 to determine whether the adder-subtracter 202 is to perform an add or subtract operation during the ensuing iteration. The result of the comparison in the exclusive Or circuits 347 and 348 is stored in the latch 212 for use throughout the present iteration. It is pointed out that the circuit 347 is an exclusive Or circuit, and the circuit 348 is $\overline{\text{exclusive Or}}$ circuit. The quotient bits may be taken from the zero output sides of the latches 210 through 212 by sampling And circuits 361 through 363 with signals on respective lines 364 through 366 at time T4 or at any time between time T4 and time T1 of the subsequent iteration.

Thus it is seen how the lookahead logic 25 in FIGURES 5 and 6 determines how the adder-subtracter circuits 200 through 202 in FIGURE 5 should be manipulated during a given iteration. These determinations are made and set in flip-flops 210 through 212 at respective times T1, T2 and T3 of the present iteration. When the G signal shown in FIGURE 3 is applied to the line 229 in FIGURE 6, controls throughout the lookahead logic 25 process for the next iteration by utilizing the divisor and the remainder $R_{1+1}$ from adder circuit 202 to determine the control signals which are to be utilized at times T2 and T3 of the next iteration to determine the control signals for the adder-subtracter 201 and 202, after the control signal has been developed in the next iteration for the adder-subtracter 200. The divider circuit in FIGURES 5 and 6 permits three partial remainders to be developed, one each in the adder-subtracters 200 through 202, and three quotient bits to be provided during each iteration.

In order to illustrate for reference purposes how a serial divider with a single serial adder customarily operates to generate a quotient, let it be assumed that a Dividend (DD) of 0.01111 and a Divisor (DV) of 0.11000 are used. If a divider with a single adder-subtracter is employed, it requires six iterations and a termination cycle to develop the quotient. The sequence of events are illustrated in Chart II below.

CHART II

DD 0.01111 = $\frac{15}{32}$

DV 0.11000 = $\frac{24}{32}$

| | | | |
|---|---|---|---|
| (1) | 2 DD | 00.11110 | SUB: because DV Sign=DD Sign |
| | DV | 0.11000 Sub | $\overline{Q}_{Sign}=1$ because ↑ |
| | | 0.00110 | |
| (2) | 2 $R_1$ | 00.01100 | SUB: DV Sign=$R_1$ Sign |
| | DV | 0.11000 Sub | $Q_2=1$ |
| | | 1.10100 | |
| (3) | 2 $R_2$ | 11.01000 | ADD: Sign DV≠$R_2$ Sign |
| | DV | 0.11000 Add | $Q_3=0$ |
| | $R_3$ | 0.00000 | |
| (4) | 2 $R_3$ | 00.00000 | SUB: DV Sign=$R_3$ Sign |
| | DV | 0.11000 Sub | $Q_4=1$ |
| | $R_4$ | 1.01000 | |
| (5) | 2 $R_4$ | 10.10000 | ADD: DV Sign≠$R_4$ Sign |
| | DV | 0.11000 Add | $Q_5=0$ |
| | $R_5$ | 1.01000 | |
| (6) | 2 $R_5$ | 10.10000 | ADD: DV Sign≠$R_5$ Sign |
| | DV | 0.11000 Add | $Q_6-0$ |
| | $R_6$ | 1.01000 | |

A termination cycle is required in order to make the sign of the remainder the same as the sign of the dividend.

$\overline{Q}_{Sign}$ . . . $Q_6$
1.10100

0.10100 = $\frac{20}{32}$ Ans

| | | |
|---|---|---|
| $R_6$ | 1.01000 | |
| DV | 0.11000 Add | |
| | 0.00000 True Remainder | |

In order to illustrate how the serial divider arrangement of FIGURES 5 and 6 may be operated to provide three quotient bits per iteration, let it be assumed that a Divisor (DV) of 0.0111 is inserted in the delay line 20 in FIGURE 5, and a Dividend (DD) of 0.11000 is inserted in the delay line 21. The dividend and the divisor are represented by a serial train of signals wherein a positive signal represents a binary one and a negative signal or the absence of a signal represents a binary zero. The low order bit is supplied first followed in successive bit periods by the higher order bits. The sign is located to the left of the binary point. A one to the left of the binary point represents a negative sign. Positive numbers are represented in true form, and negative numbers are represented in the two's complement form. The divisor signals are recirculated in the delay line once each iteration. The remainder is repetitively recycled through the serial adder-subtracters 22 and the delay line 21 once each iteration. The sequence of events are illustrated in Chart III below wherein the adder-subtracters 200 through 202 are designated respectively as A/S #1, A/S #2, and A/S #3.

CHART III $DD=0.01111=R_0$
DV=0.11000

T1
T0
Ta

Starting cycle:

Event (1) at C:
2 $R_0$ =00.11110
DV = 0.11000
.110000 ...
(C=1) ←G→

Event (2) at B:
2 $R_0$ =00.11110
DV = 0.11000
.000000 ...
(B=0) ←G→

Event (3) at Sum:
2 $R_0$ =00.11110
DV = 0.11000
.101100 ...
(SH=1) ←G→ Ta is last bit time of G.

Event (4) at Diff:
2 $R_0$ =00.11110
DV = 0.11000
.001100 ...
(DH=0) ←G→ Ta is last bit time of G.

Event (5) at C1:
2 sum = 1.01100
DV = 0.11000
.110000 ...
(C1=1) ←G→

Event (6) at B1:
2 sum = 1.01100
DV = 0.11000
.100000 ...
(B1=1) ←G→

Event (7) at C2:
2 Diff = 0.01100
DV = 0.11000
.110000
(C2=1) ←G→

Event (8) at B2:
2 Diff = 0.01100
DV = 0.11000
.100000
(B2=1) ←G→

FIRST ITERATION

Event (9) at time T1: $R_0$ (Sign)=0, DV (Sign)=0 — Set A/S #1 to Sub and $\overline{Q}$ sign=1

Event (10) at time T2: #1 Add=0, #1 Sub=1, C=1, B=0
B=0, $R_0$=0 } are inputs to exclusive Or circuits 324 and 325.
∴ $B\overline{\oplus}R_0$ High Order Bit $=0\overline{\oplus}0=1$
$B\oplus R_0$ High Order Bit $=0\oplus0=0$
∴ Set A/S #2 to Sub and $Q_2=1$ Event (11) at time T3: #1 Add=0, #1 Sub=1, #2 Add=0, #2 Sub=1, C1=1, B1=1, C2=1, B2=1
DH=0 is on one input to exclusive Or circuits 347 and 348, and B2=0 is the other input.
$B2\overline{\oplus}DH=1\overline{\oplus}0=0$
$B2\oplus DH=1\oplus0=1$
∴ Set A/S #3 to Add and Q=0

The specified operations (Sub. at A/S #1, Sub. at A/S #2, Add at A/S #3) are performed during iteration 1 and the resulting remainder emerges from A/S #3 during the iteration. This remainder is $R_3$ from Chart II. This remainder is used during the first iteration to determine the operations at A/S #1, A/S #2, A/S #3 for the second iteration as illustrated below.

$R_3=0.00000$
DV=0.11000

Event (1) at C:
2 $R_3$ =00.00000
DV = 0.11000
.000000 ...
(C=0) ←G→

Events (2) at B:
2 $R_3$ =00.00000
DV = 0.11000
.110000 ...
(B=1) ←G→

Event (3) at Sum:
2 $R_3$ =00.00000
DV = 0.110000 ...
(SH=1) ←G→

Event (4) at Diff:
2 $R_3$ =00.00000
DV = 0.11000
.010000 ...
(DH=0) ←G→

Event (5) at C1:
2 sum = 1.10000
DV = 0.11000
.100000. ..
(C1=1) ←G→

Event (6) at B1:
2 sum = 1.10000
DV = 0.11000
.110000 ...
(B1=1) ←G→

Event (7) at C2:
2 Diff = 0.10000
DV = 0.11000
.100000 ...
(C2=1) ←G→

Event (8) at B2:
2 Diff = 0.10000
DV = 0.11000
.110000 ...
(B2=1) ←G→

SECOND ITERATION

Event (9) at time T1: $R_3$ sign=0, DV sign=0 — ∴ Set #1 sub and $Q_4=1$

Event (10) at time T2: #1 Add=0, #1 Sub=1, C=0
B=1 and $R_3$ High order bit=0
∴ $B\overline{\oplus}R=1\overline{\oplus}0=0$
$B\oplus R=1\oplus0=1$
∴ Set #2 Add and $Q_5=0$

| | | |
|---|---|---|
| Event (11) at time T3: | #1 Add=0 | DH=0 and C2=1 |
| | #1 Sub=1 | $\therefore DH\overline{\oplus}C2=0\overline{\oplus}1=0$ |
| | #2 Add=1 | $DH\oplus C2=0\oplus 1=1$ |
| | #2 Sub=0 | $\therefore$ Set A/S #3 to Add and Q=0 |
| | C1=1 | |
| | B1=1 | |
| | C2=1 | |
| | B2=1 | |

The specified operation (Sub at A/S #1, Add at A/S #2, Add at A/S #3) are performed during iteration 2 and the resulting remainder emerges from A/S #3 during the iteration. This remainder is $R_6$ from Chart II.

$$R_6=1.01000$$

A termination cycle is required in order to make the sign of the remainder the same as the sign of the dividend $$R_6=1.01000$$

| | | |
|---|---|---|
| $R_6$ | 1.01000 | |
| DV | 0.11000 | Add |
| | 0.00000 | |

| | | | | | | |
|---|---|---|---|---|---|---|
| The quotient generated is, $\overline{Q}$ sign | Q2 | Q3 | Q4 | Q5 | Q6 | |
| =0 | 1 | 0 | 1 | 0 | 0 | $=\frac{20}{32}$ |

The sequence of events which take place in the divider of FIGURES 5 and 6 are explained next. Initially the dividend is supplied through a one bit delay circuit 380 and an Or circuit 381 to the delay line storage register 21 in FIGURE 5, and the divisor is inserted at the same time in the delay line register 20. The adder-subtracters 200 through 202 in FIGURE 5 are disabled by means not shown during the time when the divisor is being inserted in the delay line storage register 20. The adder-subtracters 200 through 202 are enabled as soon as the divisor is inserted in the delay line storage register 20. Signals representing the divisor and the dividend are supplied to the lookahead logic 25 in FIGURE 6 as they are inserted in their respective storage registers. The events (1) through (8) in Chart III take place during G time. Event (1) in Chart III shows the divisor and the dividend as they are supplied during the starting cycle as signals to the partial adder 220 in FIGURE 6 to determine if a carry C will be generated at the output of the adder-subtracter 200 in the next iteration if an add operation is performed therein. The latch 221 is set to the one state in the starting cycle by the combination of signals presented by the divisor and the dividend, and this is signified at event (1) by the expression "$C=1$." This signifies that a carry signal C will be generated at the output of the adder-subtracter 200 in FIGURE 5 in the next iteration if an add operation is performed therein.

Event (2) in Chart III shows the generation of the borrow condition B which is determined during the starting cycle in the partial adder 220 in the FIGURE 6 and stored in the latch 222. The borrow condition determined in the partial adder 220 is signified in Chart III at event (2) by the expression "$B=0$" which signifies that the latch 222 is set to the zero state, and no borrow will be generated at the output of adder-subtracter 200 in the next iteration if a subtract operation is performed therein.

Event (3) in Chart III signifies that the half adder 250 in FIGURE 6 responds to the signals representing the divisor and the dividend during the starting cycle and generates a sum signal which is gated by the And circuit 260 at time T$a$ to set the flip-flop 264 to the one state. The one output of this flip-flop, designated SH, represents the high order sum bit which will be generated at adder-subtracter 200 in the next iteration if an add operation is performed. The expression $SH=1$ in Chart III at event (3) signifies that the high order sum bit will be a one with the given dividend and divisor bits.

Event (4) in Chart III shows what is determined by the half subtracter 251. This half adder generates a $\overline{\text{difference}}$ signal which is gated at time T$a$ through the And circuit 263 to reset the flip-flop 265 to the zero state. The one output of the flip-flop 265 is a negative level representing difference. This is signified in Chart III at event (4) by the expression "$DH=0$" which signifies that the high order sum bit from the adder-subtracter 200 in FIGURE 5 will be a zero in the next iteration if a subtract operation is performed therein.

The events (5) through (8) in Chart III show the determination of the carries C1 and C2 and the borrows B1 and B2 which are determined by the partial adder 280 in FIGURE 6. The results are stored in the latches 300 through 303. Event (5) indicates that a carry $C1=1$ will be generated at the output of adder-subtracter 201 in FIGURE 5 in the next iteration if an add operation is performed therein, and event (6) indicates that a borrow $B1=1$ will be generated at the output of adder-subtracter 201 in FIGURE 5 in the next iteration if a subtract operation is performed therein. Event (7) in Chart III signifies that a carry $C2=1$ will be generated at the output of adder-subtracter 201 in FIGURE 5 during the next iteration if an add operation is performed therein, and event (8) signifies that a borrow $B2=1$ will be generated at the output of the adder-subtracter 201 in FIGURE 5 during the next iteration if a subtract operation is performed therein.

From the determinations of events (1) through (8) in Chart III the lookahead logic 25 in FIGURES 5 and 6 is able to properly set the latches 221 and 222, the flip-flops 264 and 265, and the latches 300 through 303. Signals from these circuits in FIGURE 6 are supplied to that portion of the lookahead logic 25 in FIGURE 5 for the purpose of determining the controls for the adder-subtracters 200 through 202 for the next iteration.

Events (1) through (8) take place simultaneously during G time, but the events (9) through (11) take place at respective times T1 through T3 of the first iteration. It is pointed out that the events thus far have taken place in the starting cycle during which period the divisor and the dividend are inserted, and the adder-subtracters 200 through 202 are disabled. The adder-subtracters 200 through 202 are enabled at the end of the starting cycle.

The first iteration is arbitrarily designated as starts with time T0, and a pulse at time T0 gates the sign of the divisor through the And circuit 313 in FIGURE 5 to the flip-flop 311. The state of the flip-flop 311 represents the sign of the divisor, and signals from this flip-flop are supplied to the exclusive Or circuits 314 and 315 in FIGURE 5 at or prior to time T1. During time T1 signals representing the sign of the remainder are applied to the exclusive Or circuits 314 and 315 in FIGURE 5, and a positive signal is applied on the line 316 at time T1 to the exclusive Or circuits 314 and 315. As illustrated at event (9) in Chart III at time T1, the sign of the remainder and the sign of the divisor are both 0. Accordingly, the $\overline{\text{exclusive Or}}$ circuit 315 receives two negative input signals, and it supplies a positive output signal to the zero input side of the latch 210, and this latch is set to the zero state. Thus the zero output line of the latch 210 supplies a positive signal level which manipulates the adder-subtracter 200 to perform a subtract operation during the first iteration. Event (10) at time T2 determines how the adder-subtracter 201 is manipulated. The high order bit or the remainder $R_0$, which is the dividend, is gated at time T0 and stored in the flip-flop 323. The output of this flip-flop is supplied to the exclusive Or circuits 324 and 325. An overflow condition represented by a carry C or a borrow B is represented by a signal from the Or circuit 332 to the exclusive Or circuits 324 and 325. A signal on the line 332 at time T2 operates the exclusive Or circuits 324 and 325. Since the Borrow B is zero and the high order bit of the remainder $R_0$ is zero, they produce a positive output signal from the exclusive Or circuit 325 to the latch 211, and this latch is set to the zero state during time T2. The positive output level from the zero output side of the latch 211 manipulates the adder-subtracter 201 to perform a subtract operation during the first iteration.

At time T3 of event (11) in Chart III the determination is made as to whether the adder-subtracter 202 in FIGURE 5 is manipulated to perform an add or subtract operation in the first iteration. The And circuit 345 in FIGURE 5 receives positive signal levels on its three inputs which are B2 from the latch 303 in FIGURE 6, the zero output side of the latch 210 in FIGURE 5 and the zero output side of the latch 211 in FIGURE 5. The positive output signal from the And circuit 345 signifies an overflow condition, and it is applied through the Or circuit 349 to the exclusive Or circuits 347 and 348. The other input to these exclusive Or circuits is a negative signal level from the Or circuit 346. The And circuit 340 in FIGURE 5 receives a negative signal level from the one output side of the flip-flop 264 in FIGURE 6. Thus the output signal from the And circuit 340 is a negative signal. The And circuit 341 receives a positive signal level from the zero output side of the latch 210 in FIGURE 5 and a negative signal level from the one output side of the flip-flop 265 in FIGURE 6. Thus the output of the And circuit 341 is a negative level. The positive and negative signal levels applied to the exclusive Or circuits 347 and 348 operate the exclusive Or circuits 347 to provide a positive output level to the latch 212 at time T3, and this latch is set to the one state during time T3. The positive signal level on the one output side of the latch 212 manipulates the adder-subtracter 202 to perform an add operation during the first iteration.

At the termination of time T3 in FIGURE 3, G time begins, and the remainder $R_0$ and the divisor DV are supplied in serial fashion to the adder-subtracter circuit 200 with the low order bits first, followed by the higher order bits in succession. The adder-subtracter 200 performs a subtract operation, and its output, representative of $R_1$ is supplied to the adder-subtracter 201 which performs a subtract operation. The output of the adder-subtracter 201, representative of $R_2$, is supplied to the adder-subtracter 202 which performs an add operation. The output of the adder-subtracter 202 represents the remainder R3 and it is supplied to the delay line storage register 21 in FIGURE 5. During G time of the first iteration events (1) through (8) take place, and calculations are made by the lookahead logic 25 to determine the sum, difference, carry and borrow conditions C, C1, C2, B, B1, and B2 in the manner explained with reference to the starting cycle. This information is used at events (9) through (11) at respective times T1 through T3 of the second iteration.

At the end of the second iteration the remainder R6 emanates from the adder-subtracter 202. A termination cycle is employed to make the sign of the remainder the same as the sign of the dividend, and this is accomplished by adding the divisor to the remainder. The quotient thus determined is 0.10100 which is $^{20}/_{32}$. The quotient bits are gated from the And circuits 361 through 363 in FIGURE 5 at time T4 of each iteration to a quotient register 24 in FIGURE 1. At the time the termination cycle is made to correct the sign of the remainder, the quotient is complemented, and it is changed from a negative number to a positive or true number. This is illustrated in Chart III at the correction cycle. Thus it is seen that the quotient generated in two iterations by the divider in FIGURES 5 and 6 requires six iterations when developed by a single adder-subtracter in the manner illustrated in Chart II above.

While the invention has been particularly shown and described with reference to preferred embodiments thereof, it will be understood by those skilled in the art that various changes in form and details may be made therein without departing from the spirit and scope of the invention.

What is claimed is:

1. A serial divider arrangement operated in successive iterations including first means to store and cyclically present signals representative of a dividend and remainders, second means to store and cyclically present signals representative of a divisor, the improvement comprising: an arithmetic device having an input end and an output end with a plurality of single stage adder-subtracter devices, connected in tandem therebetween, means connecting said first means to the input end of said arithmetic device, means connecting said second means to each adder-subtracter of said arithmetic device, first control means connected to the plurality of single stage adder-subtracter device which manipulates them selectively to add or subtract during a given iteration, and lookahead logic means connected to the second means and the output end of the arithmetic device, said lookahead logic means including second control means which determines during a given iteration all possible overflow conditions including carry and borrow conditions which may emanate from each single stage adder-subtracter in the next iteration and all high order bits for an add and a subtract operation which my be developed in each adder-subtracter except the first one, and third control means in said lookahead logic means coupled between said first and second control means which responds to signals representing the signs of the divisor and the dividend or remainder, signals representing the possible overflow conditions from each single adder-subtracter device, and signals representing the high order bits for possible addition and subtraction in each adder-subtracter except the last one for determining control signals which manipulate the individual adder-subtracter devices during the next iteration.

2. The apparatus of claim 1 wherein the arithmetic device has first and second single stage adder-subtracter devices connected in tandem and the second control means of the lookahead logic means includes a partial adder which responds to signals from the second single stage adder-subtracter and signals from the second means for determining any overflow condition which may result in a single stage adder-subtracter during the next iteration.

3. The apparatus of claim 1 wherein the arithmetic device has first, second and third single stage adder-subtracter devices connected in tandem and the second control means of the lookahead logic means includes a first partial adder which determines the carry and borrow possibilities from the first adder-subtracter device, a half adder and a half subtracter which determines the high order bit for the respective sum and difference possibilities from the first adder-subtracter, and a second partial adder connected to the half adder, the half subtracter and the second means which determines the carry and borrow conditions which may emanate from the second adder-subtracter device in the next iteration.

4. A serial divider for determining a plurality of remainders for each iteration and one quotient bit for each remainder including first means to store signals representing a divisor, second means to store signals representing a dividend or remainder, the improvement comprising: third means coupled to the first and second means for determining a plurality of remainders and one quotient bit for each remainder in one iteration, said third means including an arithmetic device which is operated in successive cycles, said arithmetic device having a plurality of single stage adder-subtracters connected in series with each adder-subtracter determining different remainders during each arithmetic cycle, control means coupled to the arithmetic device for controlling the individual adder-subtracters to perform an add or subtract operation during a given arithmetic cycle, and lookahead control means connected to the first means, the second means, and the control means which operates during one arithmetic cycle to determine the proper controls for the control means during the next arithmetic cycle whereby a plurality of successive remainders are generated during each arithmetic cycle.

5. The apparatus of claim 4 wherein the arithmetic device includes two single stage adder-subtracters for generating two remainders and two quotient orders for each iteration.

6. The apparatus of claim 4 wherein the arithmetic device includes three single stage adder-subtracters.

7. A serial divider which operates in successive iterations and generates a plurality of remainders during each iteration, the improvement comprising: an arithmetic device having a plurality of adder-subtracter stages connected in tandem to form a train of adder-subtracter stages, divisor storage means connected to each adder-subtracter stage, remainder storage means connected in parallel with the arithmetic device, first control means connected to the train of adder-subtracter stages which manipulates each individual adder-subtracter stage to add or subtract during each iteration, and second control means connected to the divisor storage means and the remainder storage means which determines during each iteration control functions for use in the next iteration, and means connecting the second control means to the first control means.

8. The apparatus of claim 7 wherein the arithmetic device includes two adder-subtracters.

9. The apparatus of claim 7 wherein the arithmetic device includes three adder-subtracters.

10. A serial divider operated in successive iterations to generate a plurality of remainders and quotient order during each iteration, the improvement comprising: an arithmetic device having a plurality of individual adder-subtracter stages connected in tandem to form a train of adder-subtracter stages, divisor storage means connected to each adder-subtracter stage, remainder storage means connected in parallel with the arithmetic device, storage control means connected to the train of adder-subtracter stages to manipulate selectively each individual adder-subtracter stage to add or subtract during each iteration, and lookahead control means connected to the divisor storage means and the remainder storage means which determines during each iteration control functions for use in the next iteration, and means connecting the lookahead control means to the storage control means at a selected time during each iteration.

11. The apparatus of claim 10 wherein the arithmetic device includes two adder-subtracters.

12. The apparatus of claim 10 wherein the arithmetic device includes three adder-subtracters.

References Cited

UNITED STATES PATENTS

| | | | |
|---|---|---|---|
| 3,196,260 | 7/1965 | Pugmire | 235—173 |
| 3,234,366 | 2/1966 | Davis et al. | 235—156 |
| 3,293,421 | 12/1966 | Dieffenderfer | 235—164 |

OTHER REFERENCES

"IBM Technical Disclosure Bulletin," J. Earle and G. A. Maley, Carry Look-Ahead Adder, vol. 3, No. 9 (February 1961).

MALCOLM A. MORRISON, *Primary Examiner.*

V. SIBER, *Assistant Examiner.*